United States Patent [19]

Miyoshi et al.

[11] Patent Number: 4,687,703
[45] Date of Patent: Aug. 18, 1987

[54] MAGNETIC RECORDING MEDIUM

[75] Inventors: Takahito Miyoshi; Masaaki Fujiyama, both of Kanagawa, Japan

[73] Assignee: Fuji Photo Film Co., Ltd., Kanagawa, Japan

[21] Appl. No.: 874,185

[22] Filed: Jun. 13, 1986

[30] Foreign Application Priority Data

Jun. 17, 1985 [JP] Japan .................................. 60-131478

[51] Int. Cl.$^4$ ........................ G11B 5/708; G11B 5/714
[52] U.S. Cl. .................................... 428/323; 427/128; 428/694; 428/900
[58] Field of Search ....................... 428/323, 694, 900; 427/128

[56] References Cited

U.S. PATENT DOCUMENTS

| 4,135,016 | 1/1979 | Ogawa et al. | 428/900 |
| 4,135,031 | 1/1979 | Akashi et al. | 428/900 |
| 4,420,408 | 12/1983 | Kajimoto et al. | 428/900 |
| 4,420,532 | 12/1983 | Yamaguchi et al. | 428/900 |
| 4,425,400 | 1/1984 | Yamaguchi et al. | 428/900 |
| 4,455,345 | 1/1984 | Miyatuka et al. | 428/900 |
| 4,547,419 | 10/1985 | Nishimatsu et al. | 428/900 |
| 4,551,386 | 11/1985 | Yamaguchi et al. | 428/694 |

Primary Examiner—Paul J. Thibodeau
Attorney, Agent, or Firm—Sughrue, Mion, Zinn, Macpeak & Seas

[57] ABSTRACT

A magnetic recording medium is described, comprising a non-magnetic support having coated thereon a magnetic layer, the magnetic layer containing (i) ferromagnetic alloy particles having a specific surface area ($S_{BET}$) of 48 m$^2$/g or more and (ii) inorganic particles having an average particle size of 0.2 μm or less and having a Mohs' hardness of 6 or more in an amount of 10 to 30 wt % based on the total weight of ferromagnetic alloy particles.

6 Claims, No Drawings

MAGNETIC RECORDING MEDIUM

FIELD OF THE INVENTION

The present invention relates to an improved magnetic recording medium, and more particularly, it relates to a magnetic recording medium having improved electromagnetic properties and running durability.

BACKGROUND OF THE INVENTION

In the past, a magnetic recording medium which is prepared by dispersing ferromagnetic metal oxide particles of acicular crystals such as $\gamma\text{-}Fe_2O_3$, Co-containing magnetic iron oxide or $CrO_2$ in a binder, and coating the thus obtained dispersion on a non-magnetic support to provide a magnetic layer has generally been used as a magnetic recording medium for audio recording, video recording and for computers (hereinafter referred to as a magnetic tape in some cases). However, with recent increased demand for high density recording on the magnetic recording medium, ferromagnetic alloy particles have been commonly used instead of the conventionally used ferromagnetic metal oxide particles.

Ferromagnetic alloy particles are very suitable as ferromagnetic particles for a magnetic recording medium which is used not only for measuring instruments and computers, but also for audio and video tapes which require high density recording, because ferromagnetic alloy particles have high coercive force (Hc) and high residual magnetic flux density (Br) and is stable against temperature changes. It is expected, therefore, that if ferromagnetic alloy particles are made finer and finer, much higher recording density can be realized.

However, due to the low hardness of ferromagnetic alloy particles there are such problems that running durability of a magnetic layer prepared using those ferromagnetic alloy particles is insufficient in that the surface of a magnetic layer is easily scratched and ferromagnetic alloy particles on a magnetic layer are easily desorbed, thereby increasing dropouts. Thus, ferromagnetic alloy particles which are desorbed from a magnetic layer cause bridging of the magnetic head gap. Further, because of poor running durability of a magnetic layer, a still life of the magnetic layer also decreases upon a still mode where still images are continuously reproduced.

In order to improve running durability of a magnetic layer of a magnetic recording medium using ferromagnetic alloy particles, while keeping good electromagnetic properties thereof, it has been proposed in U.S. Pat. No. 3,833,412 to add abrasive agents (hard particles) such as corundum, silicon carbide or chromium oxide into the magnetic layer. In such a case, a relatively large amount of abrasive agent needs to be added to effectively improve running durability. However, the above method is not desirable because a magnetic layer containing a large amount of abrasive agents causes heavy wear out of a magnetic head and affects electromagnetic properties. Further, conventionally used abrasive agents incorporated into a magnetic layer tend to desorb, thereby causing bridging of the magnetic head gap.

That is, a satisfactory method which improves not only electromagnetic properties but also running durability without affecting characteristics of the magnetic recording medium as well as magnetic heads has not yet been obtained until now.

In thie connection, the inventors of the present invention have made extensive studies as to physical properties of abrasive agents, particularly the combination of particle size of abrasive agents and ferromagnetic alloy particles, and as a result thereof, it was found that the above-described defects can be overcome by use of finely divided inorganic particles (particle size: 0.2 $\mu m$ or less) which have not commonly been used and ferromagnetic alloy particles having a specific surface area of 48 $m^2/g$ or more in combination in a specific mixing ratio.

SUMMARY OF THE INVENTION

A first object of the present invention is to provide a novel magnetic recording medium.

A second object of the present invention is to provide a magnetic recording medium having excellent electromagnetic properties.

A third object of the present invention is to provide a magnetic recording medium having excellent electromagnetic properties as well as excellent running durability.

The present invention relates to a magnetic recording medium comprising a non-magnetic support having coated thereon a magnetic layer, the magnetic layer containing (i) ferromagnetic alloy particles having a specific surface area ($S_{BET}$) of 48 $m^2/g$ or more and (ii) inorganic particles having an average particle size of 0.2 $\mu m$ or less and having a Mohs' hardness of 6 or more in an amount of 10 to 30 wt % based on the total weight of ferromagnetic alloy particles.

DETAILED DESCRIPTION OF THE INVENTION

The magnetic recording medium of the present invention comprises a non-magnetic support and a magnetic layer containing ferromagnetic alloy particles dispersed in a binder and inorganic particles, provided on the non-magnetic support.

Non-magnetic supports which can be used in the present invention are not limited, and can include those that have been conventionally used, such as various synthetic resin films (e.g., polyethylene terephthalate, polyethylene, polypropylene, polycarbonate, polyethylene naphthalate, polyamide, polyamide imide, polyimide, polysulfone and polyether sulfone), and a metal foil such as an aluminum foil or a stainless steel foil. The thickness of the non-magnetic support is, generally 3 to 50 $\mu m$, preferably 5 to 30 $\mu m$, and more preferably 5 to 10 $\mu m$.

A backing layer, as described in U.S. Pat. No. 4,414,270, can be provided on the surface of the non-magnetic support which is opposite the surface on which the magnetic layer is provided.

The ferromagnetic alloy particles used in the present invention include iron-containing ferromagnetic alloy particles, cobalt-containing ferromagnetic alloy particles, or nickel-containing ferromagnetic alloy particles and have a specific surface area ($S_{BET}$) of 48 $m^2/g$ or more, and preferably 54 $m^2/g$ or more. If the specific surface area of the ferromagnetic alloy particles is less than 48 $m^2/g$, it is difficult to obtain a magnetic recording medium having the desired high electromagnetic properties. The specific surface area ($S_{BET}$) is measured by a so-called B.E.T. method as described in S. Brunauer, P.H. Emmett, and Teller, *J. Am. Chem. Soc.*, 60, 309 (1938), ibid., 57, 1754 (1935), and ibid., 59, 310, 1533, 2682 (1937).

The metal content of ferromagnetic alloy particles which can be used in the present invention is preferably 75 wt% or more based on the total weight of the ferromagnetic alloy particles, and 80 wt% or more of the metal content includes at least one ferromagnetic metal or ferromagnetic alloy component selected from Fe, Co, Ni, Fe-Co, Fe-Ni, Co-Ni, and Co-Ni-Fe. 20 wt % or less of the metal content can be other metal components (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B and P). The above ferromagnetic metal content may contain a small amount of water, hydroxides or oxides. The ferromagnetic alloy particles used in the present invention can be prepared in accordance with a conventional method.

Examples of methods for preparing ferromagnetic alloy particles are illustrated below.

(a) Reducing a complex salt of organic acids (mainly oxalate) with a reducing gas such as hydrogen.

(b) Reducing iron oxide with a reducing gas, such as hydrogen, to obtain Fe or Fe-Co particles.

(c) Heat-decomposing a metal carbonyl compound.

(d) Adding a reducing agent such as sodium boron hydride, hypophosphite or hydrazine into an aqueous solution of ferromagnetic metal to reduce it.

(e) Precipitating ferromagnetic metal particles by electrolysis with a mercury cathode and then separating particles from mercury.

(f) Evaporating metal in the presence of an inactive gas to obtain particles thereof.

The shape of the ferromagnetic alloy particles is not limited, but an acicular shape, a granular shape, a dice shape, a rice grain shape or a tabular shape can generally be employed. Among these, an acicular shape can preferably be employed.

The total amount of binder which can be included in a magnetic layer of a magnetic recording medium of the present invention is generally 10 to 100 parts by weight, preferably 20 to 40 parts by weight, particularly preferably 20 to 30 parts by weight, per 100 parts of the ferromagnetic alloy particles.

The binders forming a magnetic layer can be selected from those that are conventionally used, such as a copolymer of vinyl chloride and vinyl acetate, a copolymer of vinyl chloride, vinyl acetate and vinyl alcohol, a copolymer of vinyl chloride, vinyl acetate and maleic acid, a copolymer of vinyl chloride, vinyl acetate and acrylic acid, a copolymer of vinyl chloride and vinylidene chloride, a copolymer of vinyl chloride and acrylonitrile, a copolymer of ethylene and vinyl acetate, cellulose derivatives (e.g., nitrocellulose resin and the like), an acrylic resin, a polyvinyl acetal resin, a polyvinyl butyral resin, an epoxy resin, a phenoxy resin, a polyurethane resin, or polycarbonate polyurethane resin. Among these, a copolymer of vinyl chloride and vinyl acetate, and a polyurethane resin are preferably used.

It is necessary that a magnetic layer of a magnetic recording medium of the present invention includes inorganic particles having an average particle size of 0.2 $\mu$m or less and having a Mohs' hardness of 6 or more.

Inorganic particles used in the present invention are not limited, so long as those particles have the above-described particle size and Mohs' hardness. Examples of the inorganic particles having a Mohs' hardness of 6 or more are $Al_2O_3$ (Mohs' hardness: 9), TiO (Mohs' hardness: 6), $TiO_2$ (Mohs' hardness: 6.5), $SiO_2$ (Mohs' hardness: 7), $SnO_2$ (Mohs' hardness: 6.5), $Cr_2O_3$ (Mohs' hardness: 9). These particles can be used alone or in combination. Inorganic particles having a Mohs' hardness of 8 or more are particularly preferred. When comparatively soft inorganic particles having a Mohs' hardness of 6 or lower are employed, the inorganic particles easily desorb from a magnetic layer and hardly have abrasive action for a magnetic head, whereby head bridging easily occurs and running durability becomes poor.

An average particle size of the inorganic particles needs to be 0.2 $\mu$m or less. Preferred particle size is 0.01 to 0.2 $\mu$m. If the size exceeds 0.2 $\mu$m, a packing density of the ferromagnetic alloy particles is decreased, thereby decreasing reproduced output.

These inorganic particles are used in an amount of 10 to 30 wt %, preferably in an amount of 10 to 20 wt %, based on the weight of the ferromagnetic alloy particles. When inorganic particles are used in an amount of less than 10 wt % based on the weight of the ferromagnetic alloy particles, these particles are not effective for improving running durability, particularly for preventing head bridging. When the inorganic particles are used in an amount of more than 30 wt% based on the weight of the ferromagnetic particles, a packing density of the ferromagnetic alloy particles is decreased, thereby giving bad electromagnetic properties.

As described above, it is remarkably effective in the present invention to use the ferromagnetic alloy particles having a specific surface area of 48 $m^2/g$ or more and inorganic particles having an average particle size of 0.2 $\mu$m and having a Mohs' hardness of 6 or more.

It is preferred that in addition to the above-described inorganic particles, carbon black (particularly carbon black having an average particle size of 10 to 300 m$\mu$) is incorporated into the magnetic layer.

A method for preparing a magnetic recording medium of the present invention is illustrated hereinafter.

A magnetic coating composition is prepared by mixing ferromagnetic metal particles, binders, the abovedescribed inorganic particles, and if desired, fillers, additives with solvents.

Solvents used for mixing are those that are generally used for preparing a magnetic coating composition, such as ketones (e.g., acetone, methyl ethyl ketone, methyl isobutyl ketone, cyclohexanone, isophorone, etc.), alcohols (e.g., methanol, ethanol, propanol, butanol, isobutyl alcohol, isopropyl alcohol, methylcyclohexanol, etc.), esters (e.g., methyl acetate, ethyl acetate, butyl acetate, isobutyl acetate, isopropyl acetate, ethyl lactate, monoethyl ether glycol acetate, etc.), glycol ethers (e.g., ether, glycol dimethyl ether, glycol monoethyl ether, dioxane, etc.), aromatic hydrocarbons (e.g., benzene, toluene, xylene, cresol chlorobenzene, styrene, etc.), chlorinated hydrocarbons (e.g., methylene chloride, ethylene chloride, carbon tetrachloride, chloroform, ethylene chlorohydrin, dichlorobenzene, etc.), N,N-dimethylformaldehyde, and hexane.

Mixing can be carried out in any manner, and preferred methods of adding each ingredient can easily be determined.

For preparing a magnetic coating composition, an ordinary mixing device can be used, such as a two-roll mill, a three-roll mill, a ball mill, a pebble mill, a Tron mill, a sand grinder, a Szegvari attritor, a high speed impeller dispersing device, a high speed stone mill, a high speed impact mill, a disperser, a kneader, a high speed mixer, a homogenizer or an ultrasonic dispersing device.

Detailed technology for mixing and dispersing is described in T.C. Patton, *Flow of Coating Materials and Dispersion of Pigments*, published by Kyoritsu Shuppan, 1971, and in U.S. Pat. Nos. 2,581,414 and 2,855,156. A magnetic coating composition of the present invention can be prepared in accordance with the methods as described above.

Conventionally known additives such as dispersing agents, antistatic agents and lubricating agents can be used in combination upon preparing a magnetic coating composition.

The dispersing agents include well-known dispersing agents such as a fatty acid having 12 to 22 carbon atoms (e.g., caprylic acid, capric acid, lauric acid, myristic acid, palmitic acid, stearic acid, behenic acid, oleic acid, elaidic acid, linolenic acid, linoleic acid or stearolic acid); a metal soap comprised of an alkali (e.g., Li, Na, K) or an alkaline earth metal (e.g., Mg, Ca, Ba) of the above-described fatty acid; esters of the above-described fatty acid and esters of the above-described fatty acid wherein a hydrogen is partially or wholly substituted by a fluorine atom; an amide of the above-described fatty acid; an aliphatic amine; a higher alcohol; a polyalkylene oxide alkyl phosphoric acid ester; an alkyl phosphoric acid ester; an alkyl boric acid ester; sarcosinates; alkyl ether esters; trialkyl polyolefin oxyquaternary ammonium salt and lecithin; etc. These dispersing agents can generally be used in an amount of from 0.1 to 10 parts by weight, preferably 0.1 to 5.0 parts by weight, and more preferably 0.1 to 2.0 parts by weight, based on the ferromagnetic alloy particles.

The antistatic agents used in the present invention include electroconductive fine particles such as carbon black or carbon black graft polymers; natural surface active agents such as saponin; nonionic surface active agents such as an alkylene oxide type surface active agent, a glycerin type surface active agent or glycidol type surface active agent; cationic surface active agents such as higher alkyl amines, quaternary ammonium salts, salts of pyridine or other heterocyclic compounds, a phosphonium or a sulfonium; anionic surface active agents such as a carboxylic acid, a sulfonic acid, a phosphoric acid or a compound having an acid group such as a sulfate or a phosphate; and amphoteric surface active agents such as amino acids, aminosulphonic acids or a sulfate or a phosphate of aminoalcohol. Electroconductive fine particles which can be used as antistatic agents are used in an amount of 0.1 to 10 wt %, preferably 0.1 to 5.0 wt %, and more preferably 0.5 to 5.0 wt %, based on the ferromagnetic alloy particles. Surface active agents which can be used as antistatic agents are used in an amount of 0.1 to 10 wt %, preferably 0.1 to 5.0 wt %, and more preferably 0.1 to 2.0 wt %, based on the ferromagnetic alloy particles.

The lubricating agents used in the present invention include conventionally known lubricating agents or lubricating agents for plastics such as the above-described fatty acids, higher alcohols, fatty acid esters comprising a monobasic fatty acid having 12 to 20 carbon atoms and monohydric or polyhydric alcohols having 3 to 20 carbon atoms such as butyl stearate or sorbitan oleate, a mineral oil, an animal and vegetable oil, an olefin low polymerized compound, an $\alpha$-olefin low polymerized compound, graphite fine particles, molybdenum disulfide fine particles, teflon fine particles, and the like. The amount of lubricating agents used can be optionally determined in accordance with conventional technology.

The above-described additives such as dispersing agents, antistatic agents, lubricating agents and the like can be used for the above-described original purposes, but may be used for other purposes. For example, dispersing agents may be used as lubricating agents or as antistatic agents. It should be understood, therefore, that the above classifications of the additives due to their functions are not decisive. Accordingly, if additives having multifunctions are used, the additive amounts thereof should preferably be determined in light of multiple effects.

The thus prepared magnetic coating composition is coated on a non-magnetic support. The magnetic coating composition can be directly coated on the non-magnetic support, or can be coated thereon through an adhesive layer.

Examples of coating methods on a non-magnetic support include an air doctor coating method, a blade coating method, a rod coating method, an extrusion coating method, an air knife coating method, a squeeze coating method, an immersion coating method, a reverse roll coating method, a transfer roll coating method, a gravure coating method, a kiss coating method, a cast coating method, a spray coating method and a spin coating method. Other coating methods may be also used in the present invention.

Detailed explanations as to methods for dispersing the above-described ferromagnetic metal particles and binders and methods for coating a coating composition on a support are disclosed in Japanese Patent Application (OPI) Nos. 46011/79 and 21805/79 (the term "OPI" as used herein refers to a "published unexamined Japanese patent application").

Further, specific detailed explanations of these coating methods are described in *Coating Kogaku (Coating Engineering)*, pages 253 to 277, published by Asakura Shoten, 1971.

The dry thickness of a coated magnetic layer is generally about 0.5 to 10 $\mu$m, preferably 1.5 to 7.0 $\mu$m.

A magnetic layer thus provided on a non-magnetic support is generally subjected to magnetic orientation to orient the ferromagnetic alloy particles contained in the magnetic layer, and then dried. Further, if desired, the magnetic layer is subjected to a surface smoothing treatment. Ths thus smoothing-treated magnetic recording medium is slit to a desired shape. These treatments are described in U.S. Pat. No. 3,473,960.

The present invention is hereinafter illustrated in more detail by the following Examples and Comparative Examples. In the Examples and Comparative Examples, all parts are by weight unless otherwise specified.

EXAMPLES 1 TO 5 AND COMPARATIVE EXAMPLES 1 TO 9

The following composition was mixed and dispersed in a ball mill for 48 hours, and 5 parts of polyisocyanate were added thereto, after which they were further mixed and dispersed for 1 hour. Then, the dispersion was separated by a filter having an average pore size of 1 $\mu$m to prepare a magnetic coating composition. The thus obtained magnetic coating composition was coated by a reverse roll coating method on a polyethylene terephthalate support having a thickness of 10 $\mu$m, and dried to form a magnetic layer having a dry thickness of 4.0 $\mu$m.

| Magnetic Coating Composition | |
|---|---|
| | parts |
| Ferromagnetic alloy particles (Fe content: 94%, Zn content: 4%, Ni content: 2%, Hc: 1,500 Oe, specific surface area: shown in the Table) | 100 |
| Copolymer of vinyl chloride/vinyl acetate/maleic anhydride (86/13/1) (prepared by Nippon Zeon Co., Ltd.; 400 × 110A, degree of polymerization: 400) | 12 |
| Urethane resin ("Crisvon 7209", a trade name, manufactured by Dai-Nippon Ink And Chemicals, Inc.) | 11 |
| Polyisocyanate ("Collonate L", a trade name, manufactured by Nippon Polyurethane Co., Ltd.) | 8 |
| Abrasive agents (inorganic particles) (kind, Mohs' hardness, average particle size and additive amounts are shown in the Table) | |
| Stearic acid | 2 |
| Butyl stearate | 2 |
| Carbon black (average particle size: 40 mμ) | 2 |
| Methyl ethyl ketone | 300 |

The thus-obtained magnetic coating composition was coated on the non-magnetic support to obtain a magnetic layer. The magnetic layer thus prepred was subjected to magnetic orientation using magnets of 3,000 gauss while a magnetic coating composition was undried, thereafter dried, and was subjected to calendering treatment and further was slit to a width of 8 mm to prepare 8 mm video tape.

Reproduced Output:

The thus-obtained video tape was placed in an 8 mm video tape recorder "Fuji X-8" (manufactured by Fuji Photo Film Co., Ltd.) and signals at 7 MHz were recorded and reproduced. The reproduced output of signals recorded at 7 MHz of a sample tape prepared in Comparative Example 1 was used as a standard and defined as 0 dB. The values of the reproduced output of other sample tapes are relative values to that of Comparative Example 1.

Still Life:

Reproduction at a still mode was carried out continuously using the above-described video tape and the video tape recorder and the time for the reproduced still image to lose its clarity of recorded images by $\frac{2}{3}$ (still life) was measured.

Numbers of Tape Passes until a Bridging of Head Gap Occurs:

A tape was run repeatedly using a video tape recorder "Fuji X-8" and passes of the tape running until bridging of a magnetic head gap occurred were counted.

The results are shown in the Table.

TABLE

| Sample No. | Specific Surface Area of Ferromagnetic Alloy Particles ($m^2/g$) | Abrasive Agent (inorganic particles) | | | | Reproduced Output (dB) | Still Life (min) | Number of Tape Passes until a Bridging of Head Occurred |
|---|---|---|---|---|---|---|---|---|
| | | Kind | Mohs' Hardness | Average Particle Size (μm) | Additive Amount per Alloy Particles (wt %) | | | |
| Ex. 1 | 54 | α-$Al_2O_3$ | 9 | 0.15 | 12 | +5.0 | more than 60 min, acceptable | more than 100 passes, no occurrence |
| Ex. 2 | " | " | " | 0.2 | " | +4.0 | more than 60 min, acceptable | more than 100 passes, no occurrence |
| Comp. Ex. 1 | " | " | " | 0.3 | " | ±0 | more than 60 min, acceptable | more than 100 passes, no occurrence |
| Comp. Ex. 2 | " | " | " | 0.5 | " | −2.0 | more than 60 min, acceptable | more than 100 passes, no occurrence |
| Comp. Ex. 3 | " | " | " | 0.2 | 8 | ±0 | 50 min, unacceptable | 60 passes, occurrence |
| Ex. 3 | " | " | " | " | 20 | +3.0 | more than 60 min, acceptable | more than 100 passes, no occurrence |
| Ex. 4 | " | " | " | " | 30 | +2.0 | more than 60 min, acceptable | more than 100 passes, no occurrence |
| Comp. Ex. 4 | " | " | " | " | 35 | −1.0 | more than 60 min, acceptable | more than 100 passes, no occurrence |
| Comp. Ex. 5 | " | α-$Fe_2O_3$ | 5.5 | " | 12 | +4.0 | 20 min, unacceptable | 30 passes, occurrence |
| Ex. 5 | 48 | α-$Al_{A12}O_3$ | 9 | 0.15 | " | +2.0 | acceptable with more than 60 min | no occurrence with 100 passes or more |
| Comp. Ex. 6 | 45 | " | " | " | " | −0.5 | acceptable with more than 60 min | no occurrence with 100 passes or more |
| Comp. Ex. 7 | 40 | " | " | " | " | −1.0 | acceptable with more than 60 min | no occurrence with 100 passes or more |
| Comp. Ex. 8 | 45 | " | " | 0.3 | " | −0.5 | acceptable with more than 60 min | no occurrence with 100 passes or more |
| Comp. Ex. 9 | 40 | " | " | " | " | −1.0 | acceptable with more than 60 min | no occurrence with 100 passes or more |

As is shown in the Table, when the average particle size of inorganic particles exceeds 0.2 μm, reproduced output becomes low. When the additive amount is less than 10 wt %, still life shortens and a head gap bridging occurs. When the additive amount is more than 30 wt %, reproduced output decreases. Further, when the Mohs' hardness of the inorganic particles is lower than 6, still life shortens and a head gap bridging occurs, too.

It is clearly seen from the above results that the present invention exhibits significantly excellent effects when the inorganic particles having an average particle size of 0.2 μm or less and the ferromagnetic alloy particles having a specific surface area of 48 $m^2/g$ or more and a Mohs' hardness of 6 or more are used in combination.

The magnetic recording medium of the present invention exhibits not only excellent electromagnetic properties but also high running durability. Further in a magnetic recording medium of the present invention, in spite of use of highly hard inorganic particles, inorganic particles are hardly desorbed from a magnetic layer, whereby a head gap bridging hardly occurs while the magnetic recording medium is running. Still further, the output is not decreased.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having coated thereon a magnetic layer, wherein the magnetic layer contains (i) ferromagnetic alloy particles having a specific surface area (SBET) of 48 $m^2/g$ or more and (ii) inorganic particles having an average particle size of 0.2 μm or less and having a Mohs' hardness of 6 or more in an amount of 10 to 30 wt % based on the total weight of ferromagnetic alloy particles.

2. A magnetic recording medium as claimed in claim 1, wherein the specific surface area (SBET) of the ferromagnetic alloy particles is 54 $m^2/g$ or more.

3. A magnetic recording medium as claimed in claim 1, wherein the inorganic particles have a Mohs' hardness of 8 or more.

4. A magnetic recording medium as claimed in claim 1, wherein the inorganic particles are contained in an amount of 10 to 20 wt % based on the total weight of ferromagnetic alloy particles in the magnetic layer.

5. A magnetic recording medium as claimed in claim 1, wherein the magnetic layer contains a binder in a total amount of 10 to 100 parts by weight per 100 parts of the ferromagnetic alloy particles.

6. A magnetic recording medium as claimed in claim 1, wherein the magnetic layer contains additionally carbon black.

* * * * *